United States Patent
Feng et al.

(10) Patent No.: US 11,404,046 B2
(45) Date of Patent: Aug. 2, 2022

(54) AUDIO PROCESSING DEVICE FOR SPEECH RECOGNITION

(71) Applicant: XSail Technology Co., Ltd, Guangdong (CN)

(72) Inventors: Meng-Hao Feng, Guangdong (CN); Chao Chen, Guangdong (CN)

(73) Assignee: XSail Technology Co., Ltd, Guangdong (CN)

( * ) Notice: Subject to any disclaimer, the term of this patent is extended or adjusted under 35 U.S.C. 154(b) by 143 days.

(21) Appl. No.: 16/867,571

(22) Filed: May 6, 2020

(65) Prior Publication Data
US 2021/0225360 A1 Jul. 22, 2021

(30) Foreign Application Priority Data
Jan. 21, 2020 (CN) .......................... 202010071503.3

(51) Int. Cl.
*G10L 15/02* (2006.01)
*G10L 25/21* (2013.01)
*G10L 25/18* (2013.01)

(52) U.S. Cl.
CPC .............. *G10L 15/02* (2013.01); *G10L 25/18* (2013.01); *G10L 25/21* (2013.01)

(58) Field of Classification Search
CPC .......... G10L 15/02; G10L 25/18; G10L 25/21
See application file for complete search history.

(56) References Cited

U.S. PATENT DOCUMENTS

| | | | | |
|---|---|---|---|---|
| 6,772,315 | B1 * | 8/2004 | Perego | G06F 12/1027 711/117 |
| 2002/0184026 | A1 * | 12/2002 | Ramabadran | G10L 13/047 704/258 |
| 2005/0027514 | A1 * | 2/2005 | Zhang | G10L 25/48 704/205 |
| 2010/0318350 | A1 * | 12/2010 | Endo | G10L 21/038 704/209 |
| 2015/0154980 | A1 * | 6/2015 | Khan | G10L 21/06 704/203 |

(Continued)

FOREIGN PATENT DOCUMENTS

CN 202615783 12/2012

*Primary Examiner* — Michelle M Koeth
(74) *Attorney, Agent, or Firm* — JCIPRNET

(57) ABSTRACT

An audio processing device for speech recognition is provided, which includes a memory circuit, a power spectrum transfer circuit, and a feature extraction circuit. The power spectrum transfer circuit is coupled to the memory circuit, reads frequency spectrum coefficients of time-domain audio sample data from the memory circuit, generates compressed power parameters by performing a power spectrum transfer processing and a compressing processing according to the frequency spectrum coefficients, and writes the compressed power parameters into the memory circuit. The feature extraction circuit is coupled to the memory circuit, reads the compressed power parameters from the memory circuit, generates an audio feature vector by performing mel-filtering and frequency-to-time transfer processing according to the compressed power parameters. The bit width of the compressed power parameters is less than the bit width of the frequency spectrum coefficients.

13 Claims, 3 Drawing Sheets

(56) References Cited

U.S. PATENT DOCUMENTS

| | | | |
|---|---|---|---|
| 2016/0189706 A1* | 6/2016 | Zopf | G06F 1/3231 713/320 |
| 2019/0074028 A1* | 3/2019 | Howard | G10L 25/27 |
| 2021/0090553 A1* | 3/2021 | Shan | G10L 25/27 |

* cited by examiner

AUDIO PROCESSING DEVICE FOR SPEECH RECOGNITION

CROSS-REFERENCE TO RELATED APPLICATION

This application claims the priority benefit of China application serial no. 202010071503.3, filed on Jan. 21, 2020. The entirety of the above-mentioned patent application is hereby incorporated by reference herein and made a part of this specification.

BACKGROUND

Technical Field

The present disclosure relates to an audio processing device, and in particular to an audio processing device for speech recognition.

Description of Related Art

With the advancement of technology, more and more electronic devices begin to use voice control. Voice control will become the user interface commonly used for most electronic devices in the future. It can be seen that the recognition rate of speech recognition will directly affect the user experience of users using electronic devices. In the implementation of speech recognition, speech feature extraction is an important part. For example, one of the most commonly used speech features is Mel-scale Frequency Cepstral Coefficients (MFCC). MFCC simulate the auditory characteristics of the human ear, can reflect the human perception of speech, and have achieved a higher recognition rate in the practical application of speech recognition. Each step of speech feature extraction can be implemented by multiple hardware circuit modules. For example, a Mel filter used to generate MFCC can be implemented by using multiple triangular bandpass filters. It can be derived that the operation method of the hardware circuits for implementing speech feature extraction will directly affect the manufacturing cost, circuit area and circuit efficiency, etc. Therefore, with the increasing application of speech recognition, how to design a speech feature extraction circuit that meets the needs is one of the important topics of concern to those skilled in the art.

SUMMARY

In view of this, the present disclosure provides an audio processing device for speech recognition, which can save memory space and reduce memory bit width, thereby reducing hardware costs.

An embodiment of the present disclosure provides an audio processing device for speech recognition, which includes a memory circuit, a power logarithmic circuit, a Mel filter circuit, and a frequency-to-time transfer circuit. The power logarithmic circuit is coupled to the memory circuit, reads a plurality of frequency spectrum coefficients of time-domain audio sample data from the memory circuit, generates a plurality of power spectrum parameters according to the frequency spectrum coefficients. The power logarithmic circuit generates a plurality of compressed power parameters by performing logarithmic transfer processing on the power spectrum parameters, and writes the compressed power parameters into the memory circuit. The Mel filter circuit is coupled to the memory circuit and reads the compressed power parameters from the memory circuit. The Mel filter circuit generates a plurality of Mel frequency spectrum parameters by performing Mel-filtering processing on the compressed power parameters, and writes the Mel frequency spectrum parameters into the memory circuit. The frequency-to-time transfer circuit is coupled to the memory circuit, reads the Mel frequency spectrum parameters from the memory circuit, and generates an audio feature vector by performing frequency-to-time transfer processing on the Mel frequency spectrum parameters.

An embodiment of the present disclosure provides an audio processing device for speech recognition, which includes a memory circuit, a power spectrum transfer circuit, and a feature extraction circuit. The power spectrum transfer circuit is coupled to the memory circuit, reads a plurality of frequency spectrum coefficients of time-domain audio sample data from the memory circuit, generates a plurality of compressed power parameters by performing a power spectrum transfer processing and a compressing processing according to the frequency spectrum coefficients, and writes the compressed power parameters into the memory circuit. The feature extraction circuit is coupled to the memory circuit, reads the compressed power parameters from the memory circuit, and generates an audio feature vector by performing Mel-filtering processing according to the compressed power parameters. The bit width of the compressed power parameters is less than the bit width of the frequency spectrum coefficients.

Based on the above, in the embodiments of the present disclosure, the audio processing device for speech recognition may include a memory circuit and a plurality of circuit modules. The circuit modules are configured to perform speech feature extraction on audio data and are respectively in working status sequentially in different time periods. In this way, these circuit modules can share the same memory circuit and reuse this memory circuit in time division, thereby saving the hardware cost of the memory circuit. In addition, by performing power spectrum transfer and compressing processing by using one of the circuit modules and then writing the compressed power parameters into the memory circuit, the maximum required bit width of the memory circuit for speech feature extraction can be reduced.

In order to make the aforementioned features and advantages of the disclosure more comprehensible, embodiments accompanying figures are described in detail below.

DESCRIPTION OF THE EMBODIMENTS

Some embodiments of the present disclosure will be described in detail with reference to the accompanying drawings. The component symbols cited in the following description will be regarded as the same or similar components when the same component symbols appear in different drawings. These embodiments are only a part of the present disclosure and do not disclose all the possible implementation of the present disclosure. Rather, these embodiments are merely examples of the device claimed in the present disclosure.

Figure 1:
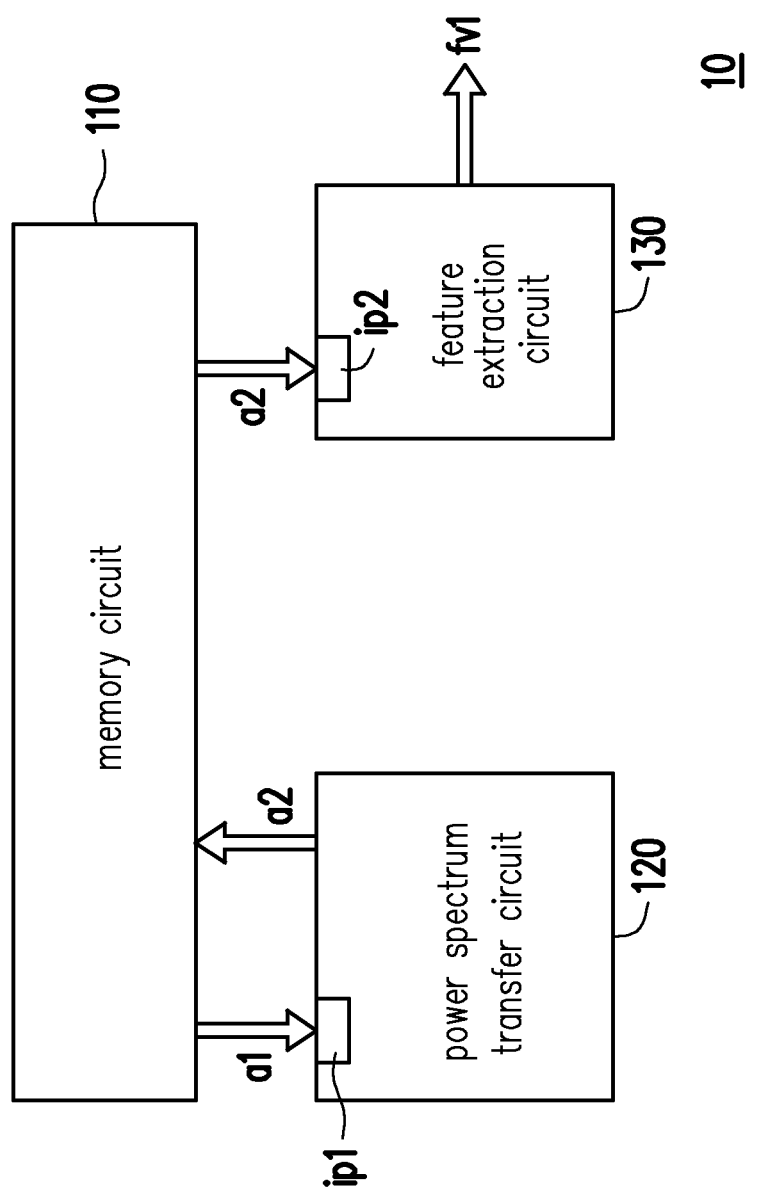
FIG. 1 is a schematic diagram of an audio processing device for speech recognition according to an embodiment of the present disclosure.

FIG. 1 is a schematic diagram of an audio processing device for speech recognition according to an embodiment of the present disclosure. Please refer to FIG. 1. An audio processing device 10 for speech recognition includes a memory circuit 110, a power spectrum transfer circuit 120, and a feature extraction circuit 130. In an embodiment, the audio processing device 10 may be implemented as an audio processing chip with a speech recognition function.

The memory circuit 110, which is configured to buffer the data during speech feature extraction, can be a static random-access memory (SRAM), but is not limited to thereto. The memory circuit 110 may be coupled to the power spectrum transfer circuit 120 and the feature extraction circuit 130 through an internal bus. The power spectrum transfer circuit 120 and the feature extraction circuit 130 may transmit and receive data to and from the memory circuit 110 through the internal bus.

The power spectrum conversion circuit 120 can read multiple frequency spectrum coefficients a1 of the time-domain audio sample data from the memory circuit 110, and generate a plurality of compressed power parameters a2 by performing a power spectrum transfer processing and a compressing processing according to the frequency spectrum coefficients a1. In detail, time-domain audio sample data is generated by sampling analog audio signals, and the sampling frequency is, for example, 8 kHz or 16 kHz. The frequency spectrum coefficients a1 are generated by performing time-to-frequency transfer processing on time-domain audio sample data in a sampling period (that is, a frame). The time-to-frequency transfer processing is, for example, a Fast Fourier Transformation (FFT), and the frequency spectrum coefficients a1 of each sampling point include a real component and an imaginary component.

The power spectrum transfer circuit 120 may perform power spectrum transfer on the frequency spectrum coefficients a1 to obtain frequency spectrum features, that is, calculate the sum of the square of the real coefficient of the frequency spectrum coefficients a1 and the square of the imaginary coefficient of the frequency spectrum coefficients a1. It can be seen that the bit width of the data generated after the power spectrum transfer will increase significantly. Therefore, in this embodiment, the power spectrum transfer circuit 120 may further perform compressing processing to generate a plurality of compressed power parameters a2, so as to achieve the purpose of compressing the bit width of the data to be written into the memory circuit 110. The above compressing processing is, for example, logarithmic processing. In other words, the bit width of the compressed power parameter a2 is less than the bit width of the frequency spectrum coefficients a1. Then, the power spectrum transfer circuit 120 writes the compressed power parameters a2 into the memory circuit 110.

The feature extraction circuit 130 can read the compressed power parameters a2 from the memory circuit 110, and generate an audio feature vector fv1 by performing Mel-filtering processing according to the compressed power parameters a2. In an embodiment, the feature extraction circuit 130 may obtain multiple audio feature parameters (also known as Mel Frequency Cepstral Coefficient (MFCC)) by using Mel-filtering processing and frequency-to-time transfer processing to obtain one multi-dimensional audio feature vector fv1. Alternatively, in another embodiment, the feature extraction circuit 130 may obtain a plurality of Mel frequency spectrum parameters by using the Mel-filtering processing and use these Mel frequency spectrum parameters as the audio feature vector fv1. Here, the feature extraction circuit 130 may be implemented by using a software module, a hardware module, or a combination thereof, the present disclosure provides no limitation thereto. The above software module may be programming codes or instructions stored in a recording medium, etc. The above hardware module may be a logic circuit implemented on an integrated circuit. For example, the programming languages can be used to implement the frequency-to-time transfer processing of the feature extraction circuit 130. In addition, the Mel-filtering processing and/or frequency-to-time transfer processing of the feature extraction circuit 130 may also be implemented as a hardware module by using hardware description languages or other suitable programming languages, and thus may include one or more micro-processors, Application-Specific Integrated Circuit (ASIC), Field Programmable Gate Array (FPGA), or other types of hardware circuit.

In an embodiment, the audio feature vector fv1 can be configured to match a preset acoustic model or provided to a machine learning model to achieve the purpose of speech recognition. In another embodiment, the audio feature vector fv1 can be matched with the preset acoustic model or provided to the machine learning model after other operations. Here, the power spectrum transfer circuit 120 and the feature extraction circuit 130 are sequentially enabled to be in a working state, and the power spectrum transfer circuit 120 and the feature extraction circuit 130 can share the same storage space of the memory circuit 110 in time division. In other words, in an embodiment, the multiple circuits for generating the audio feature vector fv1 sequentially access the memory circuit 110 in different multiple periods, that is, the memory circuit 110 is only accessed by a single circuit module at the same specific period. It should be noted that the maximum required bit width of the memory circuit 110 is determined based on the bit width of the audio feature vector fv1 output by the feature extraction circuit 130.

Here, the power spectrum transfer circuit 120 is connected to the memory circuit 110 through the input port ip1 of the power spectrum transfer circuit 120 to access the memory circuit 110 through the input port ip1 of the power spectrum transfer circuit 120. The feature extraction circuit 130 is connected to the memory circuit 110 through the input port ip2 of the feature extraction circuit 130 to access the memory circuit 110 through the input port ip2 of the feature extraction circuit 130. It should be noted that, in an embodiment, since the power spectrum transfer circuit 120 has already performed compressing processing, the feature extraction circuit 130 may not perform logarithmic operation. In addition, in an embodiment, the power spectrum transfer circuit 120 reads the frequency spectrum coefficients a1 from the memory circuit 110 through the input port ip1, and the feature extraction circuit 130 reads the compressed power parameters a2 sequentially from the memory circuit 110 through the input port ip2. Based on the above, under the circumstances that the bit width of the compressed power parameters a2 is less than the bit width of the frequency spectrum coefficients a1, the maximum required bit width of the input port ip2 of the feature extraction circuit 130 is less than the maximum required bit width of the input port ip1 of the power spectrum transfer circuit 120.

Figure 2:
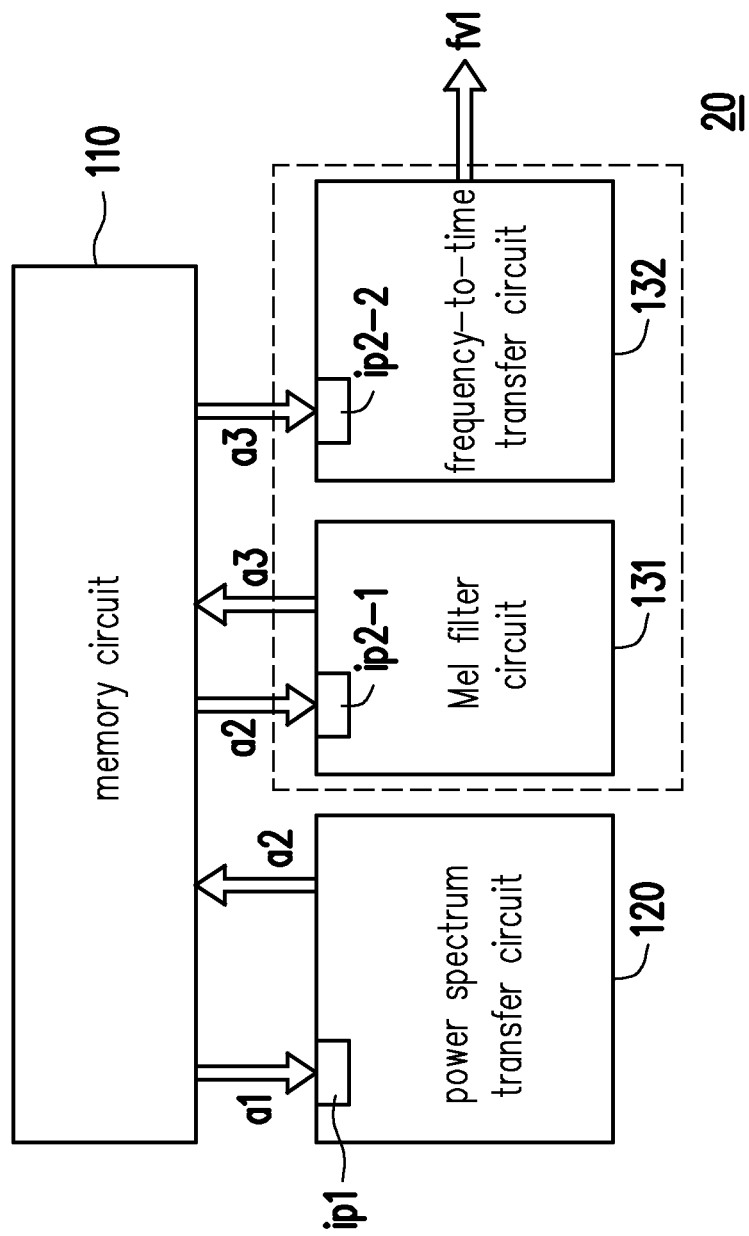
FIG. 2 is a schematic diagram of an audio processing device for speech recognition according to an embodiment of the present disclosure.

FIG. 2 is a schematic diagram of an audio processing device for speech recognition according to an embodiment of the present disclosure. Please refer to FIG. 2. In this embodiment, the feature extraction circuit 130 may include a Mel filter circuit 131 and a frequency-to-time transfer circuit 132. The Mel filter circuit 131 and the frequency-to-time transfer circuit 132 can be respectively coupled to the memory circuit 110 through the internal bus.

The power spectrum transfer circuit 120 reads multiple frequency spectrum coefficients a1 of the time-domain audio sample data from the memory circuit 110, generates multiple compressed power parameters a2 by performing power spectrum transferring processing and compressing processing according to the frequency spectrum coefficients a1, and writing the compressed power parameters a2 into the memory circuit 110. In this embodiment, the compressing process may be a logarithmic process. That is, the power spectrum transfer circuit 120 may generate multiple power spectrum parameters according to the frequency spectrum coefficients a1, and generate the compressed power parameters a2 by performing logarithmic transfer processing on the power spectrum parameters. For each sampling point in a frame, the power spectrum parameters can be generated by calculating the sum of the square of the real coefficient of the frequency spectrum coefficients a1 and the square of the imaginary coefficient of the frequency spectrum coefficients a1.

In this embodiment, the Mel filter circuit 131 may include, for example, a set of 19 non-linearly distributed triangular bandpass filters. The Mel filter circuit 131 reads the compressed power parameters a2 from the memory circuit 110, and generates a plurality of Mel frequency spectrum parameters a3 by performing Mel-filtering processing on the compressed power parameters a2. Next, the Mel filter circuit 131 writes the Mel frequency spectrum parameters a3 into the memory circuit 110. Specifically, the Mel filter circuit 131 can obtain the logarithmic energy output by each of the triangular bandpass filters according to the compressed power parameters a2, and write the logarithmic energy into the memory circuit 110. Next, the frequency-to-time transfer circuit 132 reads the Mel frequency spectrum parameters a3 from the memory circuit 110, and generate the audio feature vector fv1 by performing frequency-to-time transfer processing on the Mel frequency spectrum parameters a3, thereby obtaining MFCC of a frame. The frequency-to-time transfer processing can be discrete cosine transform (DCT) processing.

Please refer to FIG. 2. The memory circuit 110 will be sequentially read and written by the power spectrum transfer circuit 120, the Mel filter circuit 131, and the frequency-to-time transfer circuit 132 at different time periods. Therefore, the maximum required bit width of the memory circuit 110 is the maximum bit width of the three types of data (i.e., the frequency spectrum coefficients a1, the compressed power parameters a2, and the Mel frequency spectrum parameters a3) output by the power spectrum transfer circuit 120, the Mel filter circuit 131, and the frequency-to-time transfer circuit 132. In other words, the maximum required bit width of the memory circuit 110 is the maximum bit width among the bit width of the input port ip1 of the power spectrum transfer circuit 120, the bit width of the input port ip2-1 of the Mel filter circuit 131, and the bit width of the input port ip2-2 of the frequency-to-time transfer circuit 132. Meanwhile, since the power spectrum transfer circuit 120 performs logarithmic processing, the bit width of the input port ip1 of the power spectrum transfer circuit 120 will be greater than the bit width of the input port ip2-1 of the Mel filter circuit 131. In addition, in the present embodiment in which the frequency-to-time transfer processing of the frequency-to-time transfer circuit 132 is implemented by software, the bit width of the Mel frequency spectrum parameters a3 will be greater than or equal to the bit width of the frequency spectrum coefficients a1. Therefore, in an embodiment, the maximum required bit width of the memory circuit 110 is determined according to the bit width of the Mel frequency spectrum parameters a3 output by the Mel filter circuit 131. However, it should be noted that in other embodiments in which the frequency-to-time transfer processing of the frequency-to-time transfer circuit 132 is implemented by hardware, the frequency-to-time transfer circuit 132 will write the intermediate data in the operation into the memory circuit 110, and therefore the maximum required bit width of the memory circuit 110 is determined according to the bit width of the Mel frequency spectrum parameters a3 output by the Mel filter circuit 131 or the bit width of the data output by the frequency-to-time transfer circuit 132.

Figure 3:
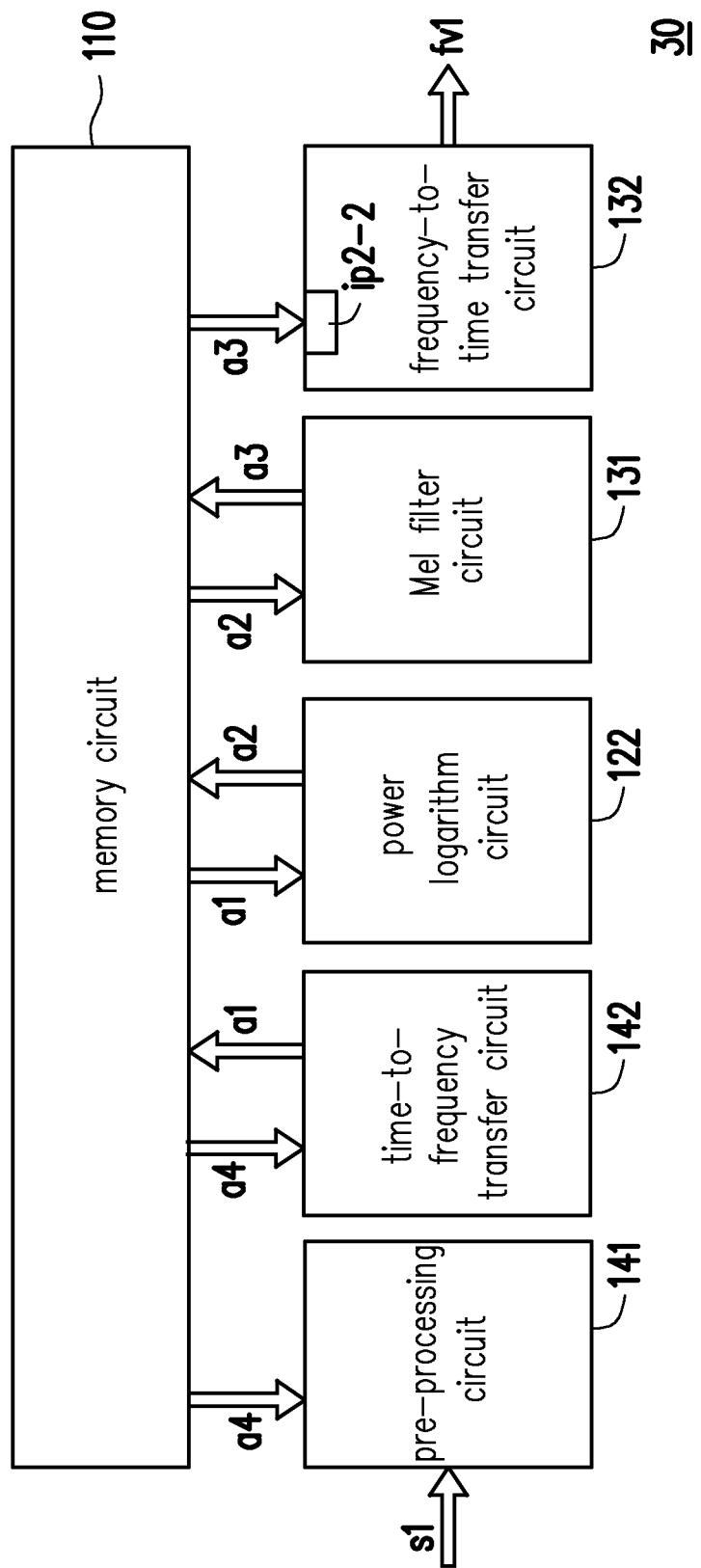
FIG. 3 is a schematic diagram of an audio processing device for speech recognition according to an embodiment of the present disclosure.

FIG. 3 is a schematic diagram of an audio processing device for speech recognition according to an embodiment of the present disclosure. Please refer to FIG. 3. The audio processing device 30 for speech recognition includes a memory circuit 110, a pre-processing circuit 141, a time-to-frequency transfer circuit 142, a power logarithm circuit 122, a Mel filter circuit 131, and a frequency-to-time transfer circuit 132. The pre-processing circuit 141, the time-to-frequency transfer circuit 142, the power logarithmic circuit 122, the Mel filter circuit 131, and the frequency-to-time transfer circuit 132 are respectively coupled to the memory circuit 110 through an internal bus to read and write data from and into the memory circuit 110.

The pre-processing circuit 141 receives the time-domain audio sample data s1 and generates pre-processed data a4 by performing audio pre-processing on the time-domain audio sample data s1. The audio pre-processing can include pre-emphasis processing, frame blocking processing, window processing, etc. In detail, the pre-processing circuit 141 may receive the time-domain audio sample data s1 after sampling the analog audio signal, and perform the pre-emphasis processing by passing the time-domain audio sample data s1 through a high-pass filter. Then, the pre-processing circuit 141 may perform the frame blocking processing by grouping N sample data into a frame, wherein adjacent frames have overlapping sample data, and the pre-processing circuit 141 can perform the window processing by multiplying each frame by a Hamming window. After all audio pre-processing is completed, the pre-processing circuit 141 writes the pre-processed data a4 into the memory circuit 110.

After the memory circuit 110 buffers sufficient pre-processed data a4 (for example, the pre-processed data a4 of 512 sample data in a frame), the time-to-frequency transfer circuit 142 reads the pre-processed data a4 from the memory circuit 110, generates the frequency spectrum coefficients a1 by performing the time-to-frequency transfer processing on pre-processed data a4. In this embodiment, the time-to-frequency transfer circuit 142 may generate frequency spectrum coefficients a1 including a real coefficient and an imaginary coefficient by performing FFT processing on the pre-processed data a4. For example, the time-to-frequency transfer circuit 142 may perform a 512-point FFT operation to generate frequency spectrum coefficients a1, but the present disclosure is not limited thereto. The time-to-frequency transfer circuit 142 writes these frequency spectrum coefficients a1 into the memory circuit 110.

The power logarithm circuit 122 reads the multiple frequency spectrum coefficients a1 of the time-domain audio sample data s1 from the memory circuit 110, and generates multiple power spectrum parameters according to the frequency spectrum coefficients a1. For each sampling point in a frame, the power spectrum parameters can be generated by calculating the sum of the square of the real coefficient of the frequency spectrum coefficients a1 and the square of the imaginary coefficient of the frequency spectrum coefficients a1. The power logarithmic circuit 122 generates a plurality of compressed power parameters a2 by performing logarithmic transfer processing on the power spectrum parameters, and writes the compressed power parameters a2 into the memory circuit 110.

In an embodiment, it can be inferred from the following equations (1) to (10) that the power logarithmic circuit 122 can generate a first logarithmic value by performing the logarithmic processing on the square of the real coefficient of the frequency spectrum coefficients a1, and generate a second logarithmic value by performing the logarithmic processing on the square of the imaginary coefficient of the frequency spectrum coefficients a1. The power logarithmic circuit 122 generates the compressed power parameters a2 by comparing the first logarithmic value with the second logarithmic value.

$$P(k) = Re^2 + Im^2 \quad \text{equation (1)}$$

$$\ln(P(k)) = \ln(Re^2 + Im^2) = \ln(x+y) \quad \text{equation (2)}$$

wherein, $P(k)$ is the power spectrum parameter; Re is the real coefficient of the frequency spectrum coefficient a1; Im is the imaginary coefficient of the frequency spectrum coefficient a1; x is the square of the real coefficient; and y is the square of the imaginary coefficient.

In continuation of the above, if $\ln(x) \geq \ln(y)$:

$$\ln(x+y) = \ln\left(x\left(1 + \frac{y}{x}\right)\right) \quad \text{equation (3)}$$

$$\ln\left(x\left(1 + \frac{y}{x}\right)\right) = \ln(x) + \ln\left(1 + \frac{y}{x}\right) \quad \text{equation (4)}$$

$$\ln(x) + \ln\left(1 + \frac{y}{x}\right) = \ln(x) + \ln\left(1 + \frac{e^{\ln(y)}}{e^{\ln(x)}}\right) \quad \text{equation (5)}$$

$$\ln(x) + \ln\left(1 + \frac{e^{\ln(y)}}{e^{\ln(x)}}\right) = \ln(x) + \ln(1 + e^{-(\ln(x)-\ln(y))}) \quad \text{equation (6)}$$

On the other hand, if $\ln(x) < \ln(y)$:

$$\ln(x+y) = \ln\left(y\left(1 + \frac{x}{y}\right)\right) \quad \text{equation (7)}$$

$$\ln\left(y\left(1 + \frac{x}{y}\right)\right) = \ln(y) + \ln\left(1 + \frac{x}{y}\right) \quad \text{equation (8)}$$

$$\ln(y) + \ln\left(1 + \frac{x}{y}\right) = \ln(y) + \ln\left(1 + \frac{e^{\ln(x)}}{e^{\ln(y)}}\right) \quad \text{equation (9)}$$

$$\ln(y) + \ln\left(1 + \frac{e^{\ln(x)}}{e^{\ln(y)}}\right) = \ln(y) + \ln(1 + e^{-(\ln(y)-\ln(x))}) \quad \text{equation (10)}$$

wherein, $\ln(x)$ represents the first logarithmic value and $\ln(y)$ represents the second logarithmic value. Based on the above, by comparing the first logarithmic value with the second logarithmic value, the power logarithmic circuit 122 can calculate the compressed power parameter a2 according to the derivation results of equations (6) and (10). Moreover, in equations (6) and (10), $\ln(1+e^{(-p)})$ can be obtained by looking up a look-up table established in advance, so the power logarithm circuit 122 can actually obtain the compressed power parameter a2 by calculating $\ln(x)$ and $\ln(y)$. It should be noted that $\ln(x) = \ln(Re^2) = 2\ln(Re)$ and $\ln(y) = \ln(Im^2) = 2\ln(Im)$. Since the power logarithmic circuit 122 performs the logarithmic processing directly after obtaining the power spectrum parameters, by performing the logarithmic processing on the real coefficient of the frequency spectrum coefficients a1 and then multiplied by 2 or performing the logarithmic processing on the imaginary coefficient of the frequency spectrum coefficients a1 and then multiplied by 2, the power logarithmic circuit 122 can generate the compressed power parameters a2.

Based on this, compared with the conventional design in which the power spectrum parameters are written into the memory circuit after the power spectrum parameters are calculated, this embodiment can avoid the requirement of writing the power spectrum parameters with a larger bit width into the memory circuit, thereby achieving the effect of reducing the maximum required bit width of the memory circuit. In other words, by performing logarithmic processing and then performing Mel filtering, the situation of writing the power spectrum parameters with large bit width into the memory circuit can be avoided.

Thereafter, the Mel filter circuit 131 reads the compressed power parameters a2 from the memory circuit 110. The Mel filter circuit 131 generates multiple Mel frequency spectrum parameters a3 by performing Mel filtering on the compressed power parameters a2, and writes the Mel frequency spectrum parameters a3 to the memory circuit 110. The frequency-to-time transfer circuit 132 reads the Mel frequency spectrum parameters a3 from memory circuit 110, and generates the audio feature vector fv1 by performing the frequency-to-time transfer processing on the Mel frequency spectrum parameters a3. The operation of the Mel filter circuit 131 and the frequency-to-time transfer circuit 132 is similar to the description of the embodiment in FIG. 2, and will not be repeated here. The maximum required bit width of the memory circuit 110 is determined according to the Mel frequency spectrum parameters a3 output by the Mel filter circuit 131.

It should be noted that, in this embodiment, the pre-processing circuit 141, the time-to-frequency transfer circuit 142, the power logarithm circuit 122, the Mel filter circuit 131, and the frequency-to-time transfer circuit 132 are respectively operated in multiple different time periods. In this manner, the pre-processing circuit 141, the time-to-frequency transfer circuit 142, the power logarithm circuit 122, the Mel filter circuit 131, and the frequency-to-time transfer circuit 132 can share the memory circuit 110 in time division, and there is no need to set up multiple memory circuits separately between the circuit modules, such that the cost of hardware required for the memory circuit can be significantly reduced and the circuit area can be decreased.

For example, please refer to FIG. 3, assuming that the sampling frequency is 16 kHz, the bit width of the time-domain audio sample data s1 can be 16 bits. The bit width of pre-processed data a4 can be 24 bits. The bit width of frequency spectrum coefficients a1 can be 24 bits. The bit width of the compressed power parameters a2 can be 19 bits. The bit width of the Mel frequency spectrum parameters a3 can be 24 bits. The bit width of audio feature vector fv1 can be 32 bits. In this case, the maximum required bit width required for the memory circuit 110 is 24 bits.

In addition, in an embodiment, the memory size of the memory circuit 110 is the maximum required bit width multiplied by the number of data sets, and the number of data sets is the operation points of the time-to-frequency transfer circuit 142 plus two. Specifically, when the operation points of the time-to-frequency transfer circuit 142 is M, the time-to-frequency transfer circuit 142 outputs M complex results, and these complex results include the imaginary coefficients and real coefficients, respectively. Therefore, the time-to-frequency transfer circuit 142 will actually generate M*2 sets of calculation data. However, according to these complex results, since they have the property of conjugate symmetry, in fact only (M*2/2)+2 sets of data need to be saved, so the memory circuit 110 needs (M+2) memory addresses. Correspondingly, the memory size of the memory circuit 110 is (M+2) multiplied by the maximum required bit width. For example, if the time-to-frequency transfer circuit 142 performs a 512-point FFT operation and the maximum required bit width is 24 bits, the memory size of the memory circuit 110 is 514 multiplied by 24 bits.

In summary, in the embodiments of the present disclosure, the memory circuit can be repeatedly used by multiple circuit modules in sequence during the audio feature extraction process, so the effect of saving memory space can be achieved. In addition, by performing logarithmic processing first followed by performing Mel filtering, it is possible to avoid the situation of writing the power spectrum parameter with a large bit width into the memory circuit, which can reduce the maximum required bit width of the memory circuit for speech feature extraction, thereby achieving the effect of reducing the circuit area and the hardware cost altogether.

Although the present disclosure has been disclosed in the above embodiments, it is not intended to limit the present disclosure, and those skilled in the art can make some modifications and refinements without departing from the spirit and scope of the disclosure. Therefore, the scope to be protected by the present disclosure is subject to the scope defined by the appended claims.

What is claimed is:

1. An audio processing device for speech recognition, comprising:
  a memory circuit;
  a power logarithmic circuit, coupled to the memory circuit, reading a plurality of frequency spectrum coefficients of a time-domain audio sample data from the memory circuit, generating a plurality of power spectrum parameters according to the frequency spectrum coefficients, generating a plurality of compressed power parameters by performing a logarithm processing on the power spectrum parameters, and writing the compressed power parameters into the memory circuit;
  a Mel filter circuit, coupled to the memory circuit, reads the compressed power parameters from the memory circuit, generating a plurality of Mel frequency spectrum parameters by performing a Mel-filtering processing on the compressed power parameters, and writing the Mel frequency spectrum parameters into the memory circuit; and
  a frequency-to-time transfer circuit, coupled to the memory circuit, reading the Mel frequency spectrum parameters from the memory circuit, and generating an audio feature vector by performing a frequency-to-time transfer processing on the Mel frequency spectrum parameters,
  wherein the power logarithmic circuit generates the compressed power parameters by comparing a first logarithmic value with a second logarithmic value, wherein the first logarithmic value and the second logarithmic value are derived from the frequency spectrum coefficients.

2. The audio processing device for speech recognition according to claim 1, further comprising:
  a pre-processing circuit, coupled to the memory circuit, receiving the time-domain audio sample data, generating pre-processed data by performing an audio pre-processing on the time-domain audio sample data, and writing the pre-processed data into the memory circuit; and
  a time-to-frequency transfer circuit, coupled to the memory circuit, reading the pre-processed data from the memory circuit, generating the frequency spectrum coefficients by performing a time-to-frequency transfer processing on the pre-processed data, and writing the frequency spectrum coefficients into the memory circuit.

3. The audio processing device for speech recognition according to claim 2, wherein the pre-processing circuit, the time-to-frequency transfer circuit, the power logarithmic circuit, the Mel filter circuit, and the frequency-to-time transfer circuit are sequentially operated in multiple different time periods, so as to respectively access the memory circuit in the multiple different time periods.

4. The audio processing device for speech recognition according to claim 2, wherein a maximum required bit width of the memory circuit is determined according to the Mel frequency spectrum parameters output by the Mel filter circuit or data output by the frequency-to-time transfer circuit.

5. The audio processing device for speech recognition according to claim 4, wherein a memory size of the memory circuit is the maximum required bit width multiplied by a number of data sets, and the number of data sets is operation points of the time-to-frequency transfer circuit plus two.

6. The audio processing device for speech recognition according to claim 2, wherein the time-to-frequency transfer processing is a Fast Fourier Transformation processing, and the frequency-to-time transfer processing is discrete cosine transform processing.

7. The audio processing device for speech recognition according to claim 1, wherein each of the frequency spectrum coefficients comprises a real coefficient and an imaginary coefficient, the power logarithmic circuit generates the first logarithmic value by performing a logarithmic processing on square of the real coefficient, generates the second logarithmic value by performing the logarithmic processing on square of the imaginary coefficient, and generates the compressed power parameters by comparing the first logarithmic value with the second logarithmic value.

8. An audio processing device for speech recognition, comprising:
  a memory circuit;
  a power spectrum transfer circuit, coupled to the memory circuit, reading a plurality of frequency spectrum coefficients of a time-domain audio sample data from the memory circuit, generating a plurality of compressed power parameters by performing a power spectrum transfer and compressing processing according to the frequency spectrum coefficients, and writing the compressed power parameters into the memory circuit; and
  a feature extraction circuit, coupled to the memory circuit, reading the compressed power parameters from the memory circuit, and generating an audio feature vector by performing a Mel-filtering processing according to the compressed power parameters,
  wherein bit widths of the compressed power parameters are less than bit widths of the frequency spectrum coefficients,
  wherein the power spectrum transfer circuit generates the compressed power parameters by comparing a first logarithmic value with a second logarithmic value, wherein the first logarithmic value and the second logarithmic value are derived from the frequency spectrum coefficients.

9. The audio processing device for speech recognition according to claim 8, wherein the power spectrum transfer circuit generates a plurality of power spectrum parameters according to the frequency spectrum coefficients, and generates the compressed power parameters by performing a logarithmic transfer processing on the power spectrum parameters.

10. The audio processing device for speech recognition according to claim 8, wherein the feature extraction circuit comprises:
 a Mel filter circuit, coupled to the memory circuit, reading the compressed power parameters from the memory circuit, generating a plurality of Mel frequency spectrum parameters by performing the Mel-filtering processing on the compressed power parameters, and writing the Mel frequency spectrum parameters into the memory circuit as the audio feature vector.

11. The audio processing device for speech recognition according to claim 8, wherein the feature extraction circuit comprises:
 a Mel filter circuit, coupled to the memory circuit, reading the compressed power parameters from the memory circuit, generating a plurality of Mel frequency spectrum parameters by performing the Mel-filtering processing on the compressed power parameters, and writing the Mel frequency spectrum parameters into the memory circuit; and
 a frequency-to-time transfer circuit, coupled to the memory circuit, reading the Mel frequency spectrum parameters from the memory circuit, and generating the audio feature vector by performing a frequency-to-time transfer processing on the Mel frequency spectrum parameters.

12. The audio processing device for speech recognition according to claim 8, wherein the feature extraction circuit does not perform logarithmic operations.

13. The audio processing device for speech recognition according to claim 8, wherein a maximum required bit width of an input port of the feature extraction circuit is less than a maximum required bit width of an input port of the power spectrum transfer circuit,
 wherein the feature extraction circuit is connected to the memory circuit through the input port of the feature extraction circuit, so as to access the memory circuit through the input port of the feature extraction circuit,
 wherein the power spectrum transfer circuit is connected to the memory circuit through the input port of the power spectrum transfer circuit, so as to access the memory circuit through the input port of the power spectrum transfer circuit.

\* \* \* \* \*